(12) United States Patent
Tamai et al.

(10) Patent No.: US 8,601,952 B2
(45) Date of Patent: Dec. 10, 2013

(54) LINEAR ACTUATOR AND ROCKING CONTROLLER FOR RAILWAY VEHICLE

(75) Inventors: Masafumi Tamai, Hiratsuka (JP); Osamu Goto, Tokyo (JP)

(73) Assignees: Moog Japan Ltd., Kanagawa (JP); Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/809,139

(22) PCT Filed: Jun. 27, 2011

(86) PCT No.: PCT/JP2011/003644
§ 371 (c)(1),
(2), (4) Date: Jan. 8, 2013

(87) PCT Pub. No.: WO2012/004945
PCT Pub. Date: Jan. 12, 2012

(65) Prior Publication Data
US 2013/0112104 A1    May 9, 2013

(30) Foreign Application Priority Data
Jul. 9, 2010 (JP) .................................. 2010-157015

(51) Int. Cl.
*F16H 3/06* (2006.01)
(52) U.S. Cl.
USPC .................. 105/199.2; 105/171; 74/89.34
(58) Field of Classification Search
USPC .................. 74/89.34, 89.23, 89.43, 840, 841; 105/171, 185, 199.2, 201; 310/80
See application file for complete search history.

(56) References Cited

U.S. PATENT DOCUMENTS

| | | | |
|---|---|---|---|
| 4,440,093 A * | 4/1984 | Kakehi et al. | 105/164 |
| 5,549,015 A * | 8/1996 | Aiso et al. | 74/89.34 |

(Continued)

FOREIGN PATENT DOCUMENTS

| | | |
|---|---|---|
| JP | 04-372459 A | 12/1992 |
| JP | 2000-085578 A | 3/2000 |

(Continued)

OTHER PUBLICATIONS

International preliminary Report on Patentability and the Written Opinion of the International Searching Authority with mailing date of Jan. 21, 2013, which corresponds to International Application No. PCT/JP2011/003644 and is related to U.S. Appl. No. 13/809,139 with English translation.

(Continued)

*Primary Examiner* — Zachary Kuhfuss
(74) *Attorney, Agent, or Firm* — Studebaker & Brackett PC

(57) ABSTRACT

The linear actuator has a hollow main body having open and closed ends, a cylinder fixed to a closed side in the body and having an open end at open side, a linear motion rod having one end extending from the open end of the body and a wear ring on an outer circumference of the other end and slidably housed in the cylinder, and a hollow shaft rotatably supported in the body, wherein the shaft has magnet on outer circumferential surface, a winding section included on an inner surface of the body and the magnet configure a hollow motor, a nut coaxially fixed to the shaft and a screw on an outer surface of the linear motion rod are engaged with each other to configure a rotation/linear motion converter, and oil seals seal a gap between the shaft and the body in both sides are included.

13 Claims, 9 Drawing Sheets

(56) References Cited

U.S. PATENT DOCUMENTS

| | | | |
|---|---|---|---|
| 5,595,089 A * | 1/1997 | Watanabe et al. | 74/89.34 |
| 5,943,962 A * | 8/1999 | Birkhahn et al. | 105/199.2 |
| 5,970,883 A * | 10/1999 | Nast | 105/164 |
| 6,131,520 A * | 10/2000 | Dull | 105/199.2 |
| 6,603,228 B1 * | 8/2003 | Sato | 310/83 |
| 7,047,833 B2 * | 5/2006 | Durschmied | 74/89.32 |
| 7,541,707 B2 * | 6/2009 | Hochhalter et al. | 310/80 |
| 8,356,557 B2 * | 1/2013 | Schneider | 105/199.2 |
| 2006/0005645 A1 * | 1/2006 | Zhou | 74/89.34 |
| 2006/0117888 A1 * | 6/2006 | Tsubono et al. | 74/424.91 |
| 2008/0190226 A1 * | 8/2008 | Kobayashi et al. | 74/89.34 |
| 2009/0165581 A1 * | 7/2009 | Koyagi et al. | 74/89.23 |
| 2010/0206103 A1 * | 8/2010 | Duits et al. | 74/89.34 |
| 2011/0016999 A1 * | 1/2011 | Kohmura | 74/89.34 |

FOREIGN PATENT DOCUMENTS

| | | |
|---|---|---|
| JP | 2000-220715 A | 8/2000 |
| JP | 2004-064983 A | 2/2004 |
| JP | 2005-075278 A | 3/2005 |
| JP | 2007-120716 A | 5/2007 |
| JP | 2009-101961 A | 5/2009 |
| JP | 2009-118732 A | 5/2009 |
| JP | 2010-115111 A | 5/2010 |

OTHER PUBLICATIONS

International Search Report; PCT/JP2011/003644; Sep. 6, 2011.

* cited by examiner

MINIMUM STROKE

MAXIMUM STROKE

LINEAR ACTUATOR AND ROCKING CONTROLLER FOR RAILWAY VEHICLE

TECHNICAL FIELD

The present invention relates to a linear actuator, and particularly relates to a linear actuator that is mounted to a vehicle such as a railway vehicle and uses a hollow motor, which damps vibration and rocking of the vehicle by an electromagnetic force, and a rocking controller for a railway vehicle, which has the linear actuator.

BACKGROUND ART

In order to suppress vibration and rocking which occur during traveling of a vehicle such as a railway vehicle, a linear actuator is used. Suppressing vibration and rocking in a lateral direction with respect to a traveling direction of a vehicle plays an important role to give passengers a comfortable ride and keep safe traveling conditions. In recent years, the study for suppressing rocking and vibration due to the influence of aerodynamic characteristics at the time of high-speed traveling by active control to keep the vehicle attitude stable has been especially advanced. Further, in general, a linear actuator that is used for prevention of rocking of a railway vehicle is used under a severe temperature condition in which the temperature variation of the use environment where it is installed is large (for example, −20C. to 60C.) even though the linear actuator is used under the severe conditions in which maintenance such as frequent replacement is difficult to carry out, and therefore, it is required to keep the function of the linear actuator stable.

Japanese Patent Application Laid-Open No. 2005-75278 (hereinafter Patent Document 11 discloses a pneumatic servo cylinder for a vehicle which generates a force against the oscillation in the lateral direction of a vehicle body. According to the configuration of Patent Document 1, Patent Document 1 indicates that the vehicle is loaded on a bogie truck via an air spring, an pneumatic servo cylinder for a vehicle is installed in a horizontal direction between a centering pin that is installed at a lower part of the vehicle and the bogie truck, an air pressure generating section is installed at an external part of the pneumatic servo cylinder for a vehicle, and compressed air is supplied as the drive source of the servo cylinder.

The controller for a railway vehicle that suppresses the vibration of a vehicle body which Japanese Patent Application Laid-Open No. 2009-101961 (hereinafter Patent Document 2) discloses is such that an electric actuator is installed between the vehicle body and a bogie truck, and the drive force by the electric actuator is controlled, whereby the function as the actuator and the damper is given thereto. Patent Document 2 indicates that as the electric actuator, the controller has the mechanism which converts rotation of the motor into a linear motion by using a ball screw, a roller screw or the like, and is caused to have the same role as the damping force of a damper with the resistance of friction or the like of the converting section.

SUMMARY OF INVENTION

Problem to be Solved by the Invention

The pneumatic servo cylinder for a vehicle according to cited Patent Document 1 has the gas pressure generating section in the place other than the main body of the pneumatic servo cylinder for a vehicle, needs to arrange piping between the main body of the pneumatic servo cylinder for a vehicle and the gas pressure generating section, and therefore, cannot realize a compact apparatus as a whole.

Further, the controller for a railway vehicle according to cited Patent Document 2 has the problem of being unable to realize downsizing of the apparatus because a linear motion generating mechanism by a ball screw 11$a$, a roller screw 11$a$ or the like and a motor 12 are disposed in series in the linearly moving direction of the controller for a railway vehicle. In the configuration, a drive section (motor) and a rotation/linear motion converting section are disposed in series in the extending direction of the cylinder stroke as can be illustrated in FIG. 11. Therefore, it is difficult to reduce the size in the stroke direction of the linear actuator.

The present invention has an object to provide a linear actuator that is a compact linear actuator which does not require an external apparatus such as a pressure generating apparatus besides a linear actuator main body, and does not require installation of piping of a pressurized fluid that is a drive source which is necessary in the case of the controller with a pressure fluid. The linear actuator provides the function as a linear actuator which gives a desired drive force or a desired damping force when necessary, and can easily be driven by an external force without giving a large load (back drive force) thereto when it is not necessary to function as a linear actuator. Further, the present invention has an object to provide a linear actuator that excludes the influence of the increase of the back drive force due to increase of viscosity of a lubricating oil at a low temperature and stably functions in a state where a back drive force is low, even under severe use conditions in which maintenance such as frequent replacement is difficult to carry out and a temperature variation in a use environment where the linear actuator is installed (−20° C. to 60° C.).

Solution to Problem

A linear actuator of the present invention has a main body of a hollow structure having an open end portion and a closed end portion, a cylindrical cylinder that is fixed to a closed end portion side in the main body, and has an open end at an open end portion side, a linear motion rod having one end portion extending from the open end portion of the main body, and the other end portion having a wear ring on an outer circumferential portion, the wear ring being housed in the cylindrical cylinder slidably in an axial direction and having a slide section that is slidable in the axial direction via a linear motion oil seal of the open end portion on an outer periphery of the open end portion side, the linear motion oil seal and the sliding section sealing an interior of the main body, and a rotary hollow shaft supported in the main body rotatably about an axis of the linear motion rod, and is characterized in that the rotary hollow shaft has a permanent magnet on a part of an outer circumferential surface, the main body has a stator winding section at a position which faces the permanent magnet, of an inner surface thereof, and the permanent magnet and the stator winding section configure a hollow motor, the rotary hollow shaft has a nut section that is fixed coaxially, the linear motion rod has a screw section which engages with the nut section, on an outer circumferential surface between the slide section and the wear ring, and the nut section and the screw section are engaged with each other to configure a rotation/linear motion converting mechanism in which by the rotary hollow shaft being rotated, the linear motion rod linearly moves in the axial direction, in both sides in the axial direction of the linear motion rod, of the nut section, two rotary oil seal sections which seal gaps between the rotary hollow shaft and members fixed to the main body are included, and the rotary oil seal sections define a first sealed region which is a region in the main body in which the linear motion rod linearly moves and in which a lubricating oil and a gas coexist by separating the first sealed region from a second sealed region in which the hollow motor is disposed, and seal the first sealed region in cooperation with the linear motion oil seal section.

A rocking controller for a railway vehicle according to the present invention is characterized by having the linear actuator that is installed between a bogie truck and a vehicle body of a railway vehicle, and a controller that actively controls drive of the linear actuator to suppress rocking of the vehicle body.

Advantageous Effects of Invention

A compact linear actuator is realized, which does not require an external apparatus such as a pressure generating apparatus besides the linear actuator main body, and does not require installation of piping of a pressurized fluid that is a drive source which is present in the case of the controller with a pressurized fluid. When necessary, the function as the linear actuator which gives a desired drive force or the linear actuator which gives a desired damping force is provided, and when it is not necessary to function as the linear actuator, the linear actuator can easily be driven by an external force without giving a large resistance force thereto. Further, the linear actuator can stably function as a linear actuator irrespective of a use environment such as a temperature.

DESCRIPTION OF EMBODIMENTS

Hereinafter, a fluid valve drive mechanism according to the present invention will be described with reference to the accompanying drawings.

Embodiment 1

Figure 1:
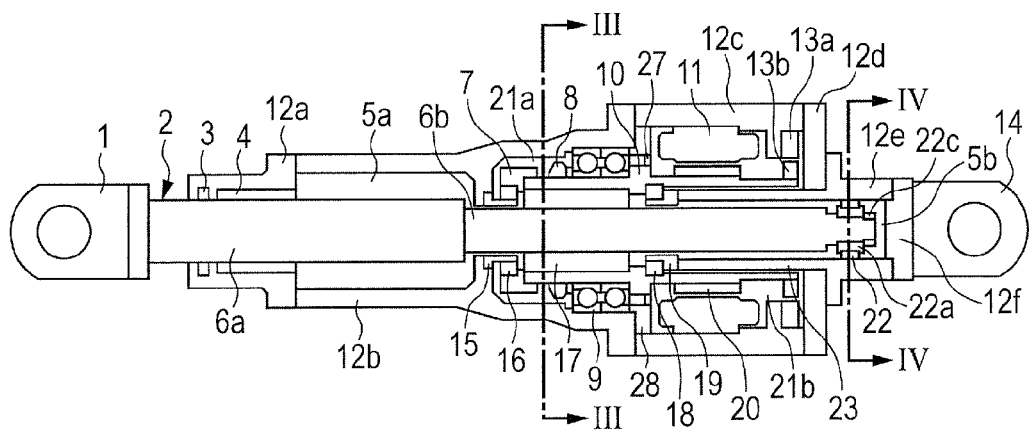
FIG. 1 is a sectional view of a linear actuator in minimum stroke according to embodiment 1.
Figure 2:
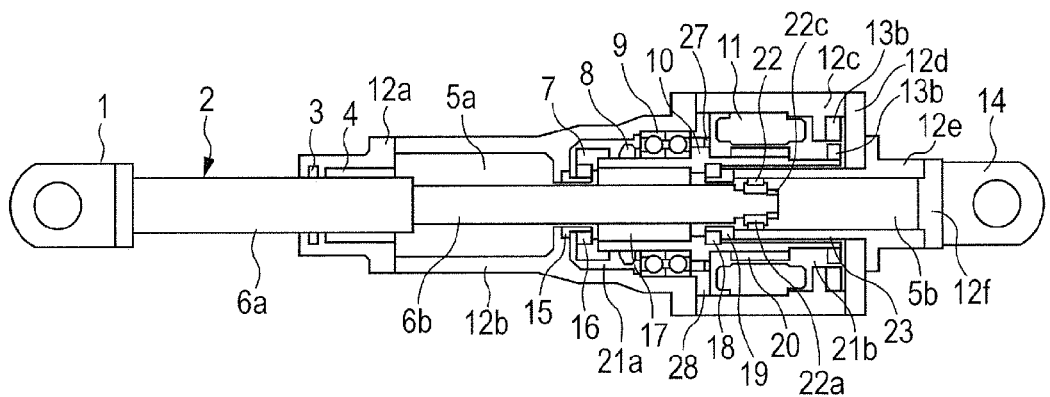
FIG. 2 is a sectional view of the linear actuator in maximum stroke according to embodiment 1.

A sectional view of a linear actuator according to embodiment 1 in a case of minimum stroke is shown in FIG. 1, and a sectional view of the linear actuator according to embodiment 1 in a case of maximum stroke is shown in FIG. 2. With reference to the sectional views of FIGS. 1 and 2, a configuration of the linear actuator of the present embodiment will be described.

The linear actuator of the present invention has a main body of a hollow structure having an open end portion and a closed end portion. As shown in FIGS. 1 and 2, a main body is configured by a linear motion bearing section casing 12a, a rotation/linear motion converting section casing 12b, a motor section casing 12c, a motor section rear portion casing 12d, a cylindrical cylinder 12e, and a cylinder rear end portion casing 12f.

The linear actuator of the present invention has a cylindrical cylinder 23 which is fixed to a closed end portion side in the main body and has an open end at the open end portion side in the main body, and a linear motion rod 2.

The linear motion rod 2 has one end portion extended outside the main body from the opening of the main body (linear motion bearing section casing 12a), and has a slide section 6a which is slidable in an axial direction of the linear motion rod 2 via a linear motion oil seal 3 of the opening of the main body, on an outer circumferential surface in the open end portion side. By the linear motion oil seal 3 and the slide section 61a, an interior of the main body is sealed. The linear motion rod 2 is supported to be linearly movable in the axial direction by a linear motion bearing 4 of the linear motion bearing section casing 12a. The linear motion rod 2 has a wear ring 22 via a wear ring holder 22a at an outer circumferential portion of the other end portion, and the other end portion of the linear motion rod 2 is housed in a cylindrical cylinder 23 in a state in which the wear ring 22 is slidable in the axial direction.

Furthermore, the linear actuator of the present invention has a rotary hollow shaft 10 which is supported in the main body to be rotatable coaxially with the linear motion rod 2 by an angular bearing 9 which is a rotation support section that is included in the main body. The angular bearing 9 is fixed to the rotary hollow shaft 10 by a bearing fixing nut 8.

The rotary hollow shaft 10 includes a rotor permanent magnet 20 in a part of an outer circumferential surface. Meanwhile, on an inner surface of the motor section casing 12c which is a part of the main body, a stator winding section 11 is included at a position facing the rotor permanent magnet 20 of the rotary hollow shaft 10. The rotor permanent magnet 20 and the stator winding section 11 configure a hollow motor. Reference signs 13a and 13b respectively denote a stator section and a rotor section of a VR type resolver (variable reluctance type resolver), which detects a rotational angle of the rotary hollow shaft as the rotor, outputs the rotational angle to a controller not illustrated, and is used for drive control of the motor.

The rotary hollow shaft 10 includes a nut section 17 of a planetary roller screw at a part of an inner circumferential surface. The nut section 17 is fixed to the rotary hollow shaft 10 coaxially with the rotary hollow shaft 10 by a nut fixing ring 7. Meanwhile, the linear motion rod 2 has a screw section 6b of the planetary roller screw, which is an engaging portion that engages with the nut section 17 of the planetary roller screw, on an outer circumferential surface between the slide section 6a and the wear ring 22. The nut section 17 and the screw section 6b are engaged with each other, and configure the planetary roller screw which is a rotation/linear motion converting mechanism. The rotary hollow shaft 10 rotates, whereby the linear motion rod 2 linearly moves in the axial direction via the planetary roller screw. In the present embodiment, the rotation/linear motion converting mechanism is realized by the planetary roller screw, but the present invention is not limited thereto, and the other mechanisms having the function of converting rotational movement into linear motion, such as a ball screw, may be used.

Figure 3:
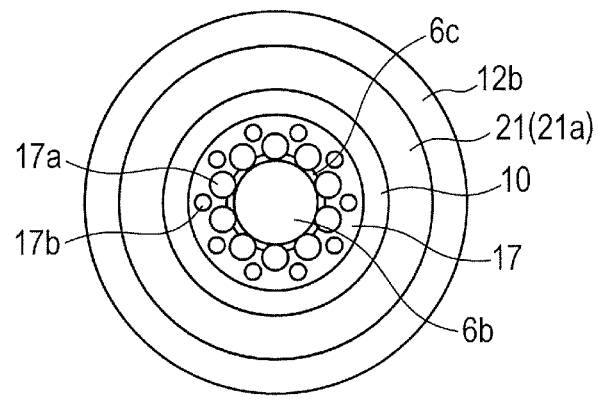
FIG. 3 is an enlarged partial sectional view of a nut section of a planetary roller screw of the linear actuator according to embodiment 1 viewed from III-III of FIG. 1.

FIG. 3 shows an enlarged partial sectional view of the nut section 17 of the planetary roller screw of the linear actuator of the present embodiment viewed from III-III of FIG. 1. The nut section 17 fixed to the inner surface of the rotary hollow shaft 10 has a plurality of rollers 17a and engages with a thread groove 6c of the screw section 6b. Further, the nut section 17 includes a plurality of through-holes 17b which penetrate in the axial direction, and provides the configuration in which lubricating oil easily moves in the axial direction via the through-holes 17b of the nut section 17.

Figure 4:
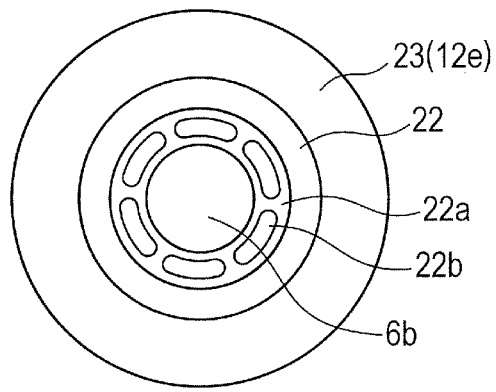
FIG. 4 is an enlarged partial sectional view of a wear ring holder section of the linear actuator according to embodiment 1 viewed from IV-IV of FIG. 1.

FIG. 4 shows a partial sectional view enlarging a part of the wear ring holder 22a of the linear actuator according to embodiment 1 viewed from IV-IV of FIG. 1. The wear ring holder 22a which supports the wear ring 22 has a recessed portion on an outer periphery thereof, and supports the wear ring 22 by the recessed portion. Further, the wear ring holder 22a has wear ring holder through-holes 22b which penetrate in the axial direction, and by the wear ring holder through-holes 22b, the wear ring holder 22a is in fluid communication in the axial direction.

At both sides in the axial direction relative to the nut section 17 of the planetary roller screw, a first oil seal 16 and a second oil seal 18 which seal gaps between a first cylindrical shaft 15 and a second cylindrical shaft 19 which are members fixed to the main body, and the rotary hollow shaft 10 are included. The first and the second cylindrical shafts 15 and 19 and the first and the second oil seals 16 and 18 respectively cooperate with one another and form the first rotary oil seal section and a second rotary oil seal section. The first rotary oil seal section 15 and 16 and the second rotary oil seal section 18 and 19 define a first sealed region 5 which is a space in the main body in which the linear motion rod 2 linearly moves and in which a lubricating oil and a gas coexist, separately from a second sealed region 21 in which the hollow motors 11 and 20 and the angular bearing 9 which is the rotation support section are disposed. Furthermore, the first rotary oil seal section and the second rotary oil seal section seal the first sealed region 5 in cooperation with the linear motion oil seal 3. A hard chrome plating or the like is desirably applied to outer circumferential surfaces of the first and the second cylindrical shafts 15 and 19 in order to give corrosion resistance, because the first and the second oil seals 16 and 18 slide on the surfaces thereof. The first and the second oil seals 16 and 18 are configured by a material such as a rubber.

The linear actuator according to the present invention uses the hollow motor including the stator winding section 11 and the rotor permanent magnet 20 as a drive source, and therefore, the drive section and the rotation/linear motion converting section are not disposed in series in the extending direction of the cylinder stroke as shown in the conventional example. Therefore, the linear actuator of the present invention can be made compact in the stroke direction of the cylinder.

An operation and a function of the present linear actuator will be described, with reference to the sectional views of the linear actuator of the present embodiment at minimum stroke shown in FIG. 1, and at maximum stroke shown in FIG. 2.

When in the state of the minimum stroke shown in FIG. 1, the hollow motor is driven in a predetermined rotational direction by the controller not illustrated, and the rotor permanent magnet 20 rotate with respect to the stator winding section 11, the rotary hollow shaft 10 and the nut section 17 of the planetary roller screw which is fixed to the rotary hollow shaft 10 rotate with this. When the nut section 17 rotates, the linear motion rod 2 linearly moves in the axial direction by the screw section 6b which is engaged therewith. Here, a first spherical bearing 1 which is fixed to an end portion of the linear motion rod 2 and a second spherical bearing 14 which is fixed to a cylinder rear end portion casing 12f of the main body are connected to members to be controlled by the present linear actuator, for example, a vehicle and a bogie truck of a train, and the movement in the rotational direction about the axis of the linear motion rod 2 is restrained. Accordingly, the rotation of the nut section 17 of the planetary roller screw is converted into the linear motion in the axial direction of the linear motion rod 2 by the screw section 6b of the planetary roller screw which is engaged therewith.

When the linear motion rod 2 linearly moves in the axial direction, the wear ring 22 on the outer periphery of the end portion of the linear motion rod 2 which is housed in the cylindrical cylinder 23 linearly moves in the cylindrical cylinder 23 while sliding on the inner circumferential surface of the cylindrical cylinder 23. The moment at the time of the present linear actuator itself receiving vibration, and the moment by the self weight dependent on the installation angle with respect to the gravity are received by the linear motion bearing 4 of the linear motion bearing section casing 12a and the slide section 6a of the linear motion rod 2, the nut section 17 of the planetary roller screw and the screw section 6b of the planetary roller screw of the linear motion rod 2, and the wear ring 22 of the linear motion rod 2 and the inner circumferential surface of the cylindrical cylinder 23. In the linear actuator according to the present invention, the hollow motor section including the stator winding section 11 and the rotor permanent magnet 20 is disposed at a second end portion side (second spherical bearing side) in the main body relative to the center in the axial direction, and therefore, the inertial moment which is generated by the applied vibration or the like can be suppressed to be small. Thereby, the effect of being capable of making the design load capacity of the linear actuator small is provided.

The linear motion rod 2 extends from the linear motion bearing section casing 12a, and is changed into the state of the maximum stroke of FIG. 2 from the state of the minimum stroke of FIG. 1, whereby the capacity of the first sealed region 5 increases. Further, the first sealed region 5 is sealed by the first and the second rotary oil seal sections 15, 16, 18 and 19 and the linear motion oil seal section 3, and therefore the pressure in the first sealed region 5 reduces by the increase in the capacity. A lubricating oil is enclosed within the first sealed region 5 for lubrication between the screw section 6b of the planetary roller screw and the nut section 17, between a sliding portion of the wear ring 22 and the inner surface of the cylindrical cylinder 23, and between the linear motion bearing 4 of the linear motion bearing section casing 12a and the slide section 6a of the linear motion rod 2. In order to enable the linear motion rod 2 to enter and exit from the first sealed region 5 which is a sealed space, a gas is enclosed within the first sealed region 5 together with the lubricating oil, and buffers variation of the pressure in the first sealed region 5. The linear actuator of the present invention is used by being installed so that the axial direction of the linear motion rod 2 is substantially horizontal, and therefore, the lubricating oil and the gas also exist in the cylindrical cylinder 23 which is a part of the first sealed region 5. When the linear motion rod 2 linearly moves, the wear ring 22 moves while sliding onto the inner surface of the cylindrical cylinder 23, and in accordance with a pressure difference at a moving time of the wear ring 22 in the axial direction inside the cylindrical cylinder 23, the lubricating oil and the gas move in the axial direction in the cylindrical cylinder 23, via the wear ring holder through-holes 22b which penetrate through the wear ring holder 22a in the axial direction.

The inner surface of the cylindrical cylinder 23 is enhanced in the wear resistance by hard chrome plating or the like. Further, when the inner surface of the cylindrical cylinder 23 wears, only a cylinder rear end portion casing 12f (cylindrical cylinder 23) is replaced, whereby the effect of being capable of keeping favorable sliding characteristics of the wear ring 22 of the linear motion rod 2 and the inner surface of the cylindrical cylinder 23 by simple component replacement is provided.

In the case of use of the linear actuator of the present invention in prevention of rocking of a railway vehicle, active control is required especially for aerodynamic characteristics at the time of high-speed traveling. For example, an instantaneous rolling of a vehicle is caused at a time of tunnel entry in high-speed traveling, rolling in the final vehicle of a train set due to the influence of Karman's vortex at high-speed traveling or the like, though it does not occur in low-speed traveling. In order to suppress the rocking and rolling, active control is not sometimes required except for predetermined conditions such as a traveling speed not higher than a predetermined traveling speed, and there is the need to cause the linear actuator to be driven by an external force without giving a load (back drive force) thereto as much as possible in the state in which the power supply of the linear actuator is turned off.

In the configuration of the present invention, the sliding portions of the first and the second rotary oil seal sections are made to have diameters which are not larger than 1.5 times as large as the diameter of the engaging section of the linear motion rod 2, more preferably diameters which are not larger than 1.3 times as large as the diameter of the engaging section of the linear motion rod 2, further more preferably diameters which are not larger than 1.15 time as large as the diameter of the engaging section of the linear motion rod 2, whereby the slide sectional areas in the first and the second rotary oil seal sections are made small, and the linear actuator can be caused to be driven by an external force with a small load. If the diameter of the slide portion of the seal section is excessively large relative to the diameter of the engaging section of the linear motion rod 2, it is not preferable, because the slide length (slide sectional area) of the seal section increases, and the load in the case of causing the linear actuator to be driven by the external force becomes large. If the diameter of the sliding portions of the first and the second rotary oil seal sections are made too small conversely, it is not preferable, because although the load to the external force due to the slide length (slide sectional area) of the seal section can be made small, the spaces between the inner surfaces of the first and the second cylindrical shafts 15 and 19 and the outer surface of the linear motion rod 2 (screw portion 6b of the planetary roller screw) become small, therefore, when the stroke of the linear motion rod 2 changes and the pressure in the first sealed region 5 varies, the fluid resistance of the lubricating oil which moves via the gap increases, the drive resistance of the actuator is increased, and the back drive force is increased.

Further, in the linear actuator of the present invention, the screw section 6b and the nut section 17 of the planetary roller screw, and the linear motion bearing 4 which easily generate abrasion powder and the like are lubricated with an oil, and since the viscosity of the oil is low, abrasion powder can be distributed without existing locally in the place where the abrasion powder is generated even if the abrasion powder and the like are generated. Therefore, the possibility of sticking or the like of the bearing section can be avoided.

Meanwhile, the angular bearing 9 which is the rotation support section included in the second sealed region 21 (21a, 21b) which is sealed by the first and the second rotary oil seal sections (15, 16, 18, 19) is lubricated with a low viscosity grease. In order to cause the linear actuator to be driven by an external force with a small load when the power supply of the linear actuator is off, the angular bearing 9 is also preferably lubricated with an oil, but in the second sealed region 21, the motor section (stator winding section 11, the rotor permanent magnet 20) is present, and therefore, in order to exclude the risk of iron powder such as abrasion powder and the like which are generated in the angular bearing 9 flowing and moving to the motor section as much as possible, a low viscosity grease is used. In a gap between the angular bearing 9 and the motor section, a noncontact labyrinth seal 27 is provided, and the gap is sealed with a low viscosity grease, the motor region 21b including the rotor permanent magnet 20, the stator winding section 11 and the VR resolvers 13a and 13b, and the bearing region 21a including the angular bearing 9 are separated, and the risk of the iron powder such as abrasion powder generated in the angular bearing 9 entering the motor region 21b is excluded. Further, the noncontact labyrinth seal 27 is installed in the outer side in the radial direction from the rotational axis relative to the rotary hollow shaft 10, and therefore, the noncontact labyrinth seal can be driven by an external force with a small load, since the seal is a noncontact seal though the circumferential length of the seal portion is long.

In the linear actuator of the present invention, the first sealed region 5 in which the linear motion rod 2 moves is sealed by the first and the second rotary oil seal sections 15, 16, 18 and 19 and the linear motion oil seal section 3, and therefore, external air is not allowed to flow into and out from the first sealed region 5 (air breather function is not included) by the pressure variation in the first sealed region 5 due to the stroke displacement of the linear motion rod 2. Therefore, even if the linear actuator continues to be used under the condition of a low temperature such as −20 degrees, reduction in the sliding function due to the phenomenon such as solidification of the water in the air is not caused, and the effect of being capable of keeping a favorable sliding state is provided. Further, the linear actuator main body of the present invention is sealed against the external air, the water, dust and the like in the air can be prevented from entering the main body, and the stable function can be maintained. In order to prevent the slide section 6a of the linear motion rod 2 from being exposed to the ambient environment, and water, dust and the like from adhering to an outer surface of the slide section 61a, when the slide section 6a projects from the linear motion bearing section casing 12a which is a distal end portion of the main body due to stroke change, a cover with a accordion fold or the like not illustrated is provided between the linear motion bearing section casing 12a and the first spherical bearing 1, and dust and the like are preferably prevented from adhering to the outer surface of the slide section 6a.

As the gas in the first sealed region 5, air or an inert gas such as nitrogen can be used.

The first sealed region 5 is a sealed space, and therefore, a product of the volumetric capacity occupied by the gas and the pressure is constant. Accordingly, when the volumetric capacity occupied by the gas in the first sealed region 5 changes from V1 to V2, and the pressure changes from P1 to P2, a pressure P2 after the volumetric capacity changes can be expressed by $$P2 = P1 \times (V1/V2) \quad (1)$$
$$= P1 \times (V1/(V1 \pm \Delta V)).$$

Here, $\Delta V$ represents a change amount (V2−V1) of the volumetric capacity occupied by the gas to V2 from V1, and represents the amount corresponding to a volume by which the linear motion rod 2 goes in and out with respect to the linear motion bearing section casing 12a. In other words, $\Delta V$ represents the volume which is expressed by a product of a sectional area of the slide section 6a of the linear motion rod 2 and the maximum stroke length. From this relation, the pressure difference within the first sealed region 5 at maximum stroke and at minimum stroke of the linear motion rod 2 is considered, and the apparatus can be designed so as to satisfy the pressure resistance conditions of the oil seal section. The allowable differential pressure condition which is recommended in an ordinary oil seal is approximately 0.3 atm. Accordingly, when the initial conditions of the pressures in the first sealed region 5 and in the second sealed region 21 are set at atmospheric pressure, the apparatus can be designed with consideration given to the volumetric capacity V of the gas at maximum stroke determined from the volumetric capacity of the first sealed region 5 and the amount of the lubricating oil, a sectional area A within a plane perpendicular to the axial direction of the linear motion rod 2 and a stroke length L so as to satisfy the condition of $$V/(V-A \times L) < 1.3 \quad (2).$$

Thereby, the linear actuator which keeps sealability in the first sealed region 5 and can keep a stable function without impairing the function of the oil seal can be provided.

(Assembly Method of the Linear Actuator of the Present Embodiment)

Hereinafter, one example of an assembly method of the linear actuator according to the present embodiment will be described with reference to FIGS. 5A to 5I.

First, an inner ring of the angular bearing is fixed to the rotary hollow shaft 10 with the bearing fixing nut 8, and the rotor permanent magnet 20 and the second oil seal 18 are fitted to the rotary hollow shaft 10. Further, by the nut fixing ring 7, the nut section 17 of the planetary roller screw is fixed to the inner circumferential surface of the rotary hollow shaft 10. Further, the first oil seal 16 is fixed to the nut fixing ring 7 (see FIG. 5A). The first cylindrical shaft 15 is installed in the rotation/linear motion converting section casing 12b which configures a part of the main body (see FIG. 5A).

Figure 5A:
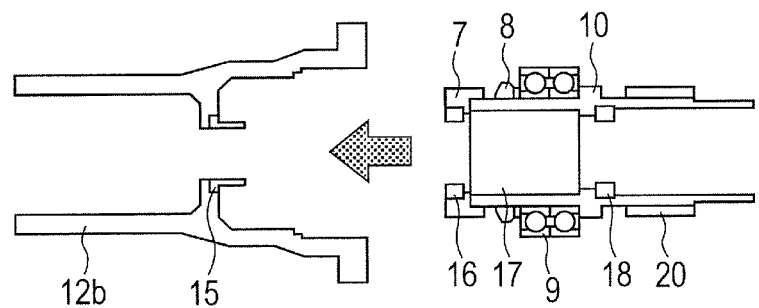
FIG. 5A is an assembly sectional view of the linear actuator according to embodiment 1 (1).
Figure 5B:
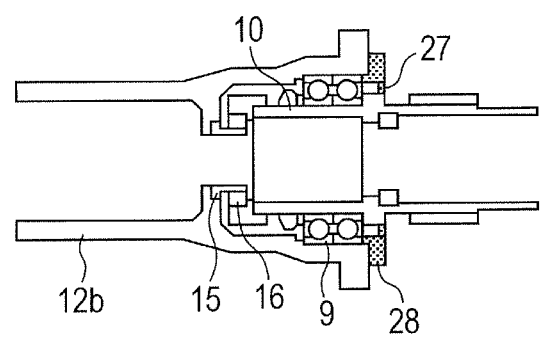
FIG. 5B is an assembly sectional view of the linear actuator according to embodiment 1 (2).

Next, while the first oil seal 16 is slid on the outer circumferential surface of the first cylindrical shaft 15, the rotary hollow shaft 10 is inserted into the rotation/linear motion converting section casing 12b via the angular bearing 9, and an outer ring of the angular bearing 9 is fixed to the rotation/linear motion converting section casing 12b by an angular bearing pressing plate 28. Further, the noncontact labyrinth seal 27 is installed between the angular bearing pressing plate 28 and the rotary hollow shaft 10 (FIG. 5B).

Figure 5C:
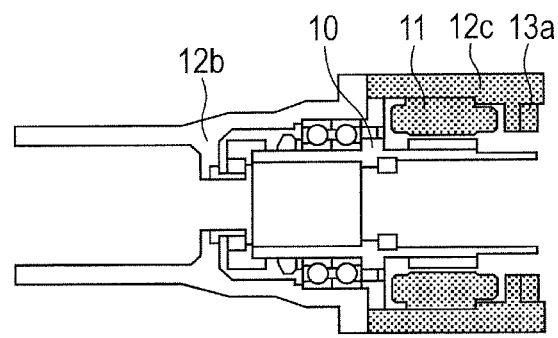
FIG. 5C is an assembly sectional view of the linear actuator according to embodiment 1 (3).
Figure 5D:
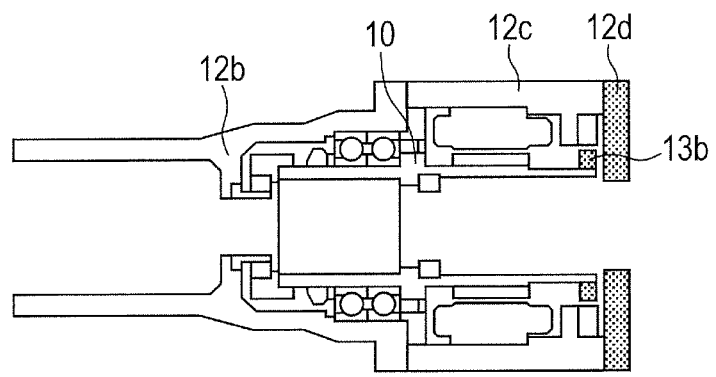
FIG. 5D is an assembly sectional view of the linear actuator according to embodiment 1 (4).

The motor section casing 12c to which the stator winding 11 of the hollow motor and the VR resolver (stator side) 13a are fixed is connected to the rotation/linear motion converting section casing 12b (FIG. 5C). Next, after the VR resolver (rotor side) 13b is fixed to the rotary hollow shaft 10, the motor section rear portion casing 12d is fixed to the end portion of the motor section casing 12c (FIG. 5D).

Figure 5E:
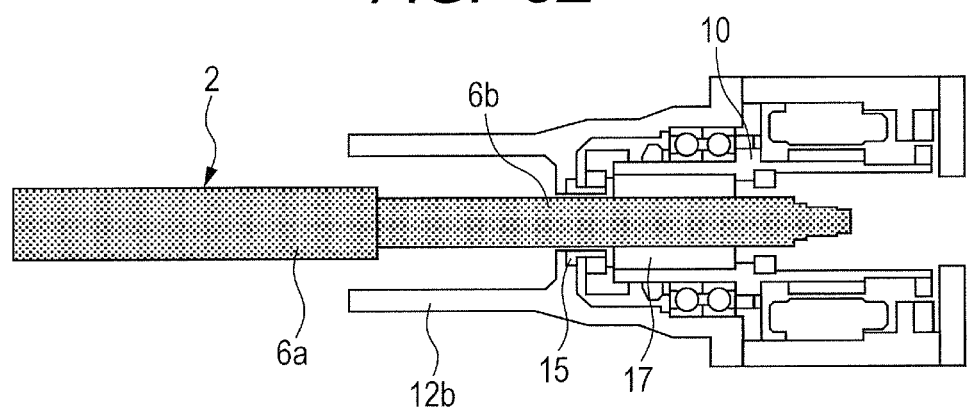
FIG. 5E is an assembly sectional view of the linear actuator according to embodiment 1 (5).

The linear motion rod 2 and the screw section 6b of the planetary roller screw are connected to each other, and the thread groove 6c of the screw section 6b of the planetary roller screw is inserted from the opening side of the rotation/linear motion converting section casing 12b, while being engaged with the nut section 17 (FIG. 5E).

Figure 5F:
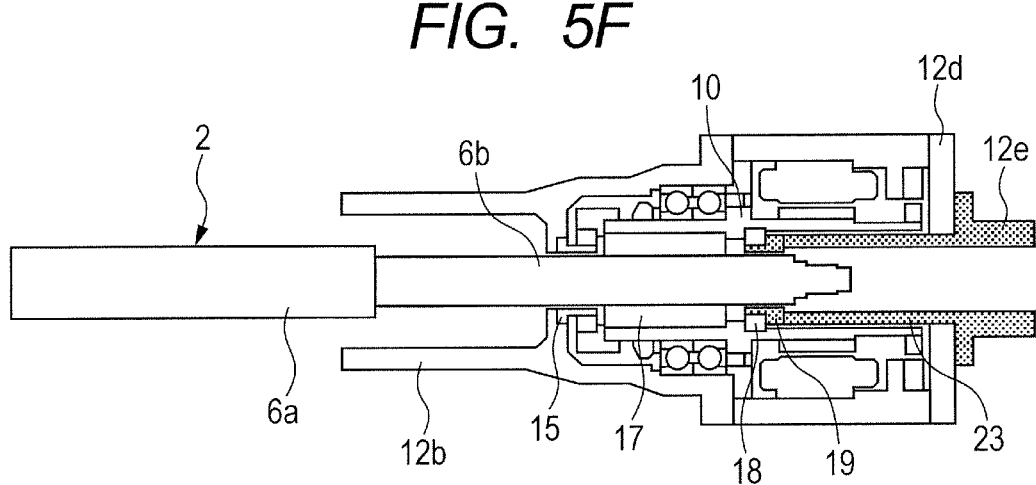
FIG. 5F is an assembly sectional view of the linear actuator according to embodiment 1 (6).

Next, the cylindrical cylinder 23 in which the second cylindrical shaft 19 is fixed to an end portion in advance is inserted from an opening in a center of the motor section rear portion casing 12d, the second cylindrical shaft 19 is inserted into the second oil seal 18 while the second cylindrical shaft 19 is slid with respect to the second oil seal 18, and the cylindrical cylinder 23 is fixed to the motor section rear portion casing 12d (FIG. 5F).

Figure 5G:
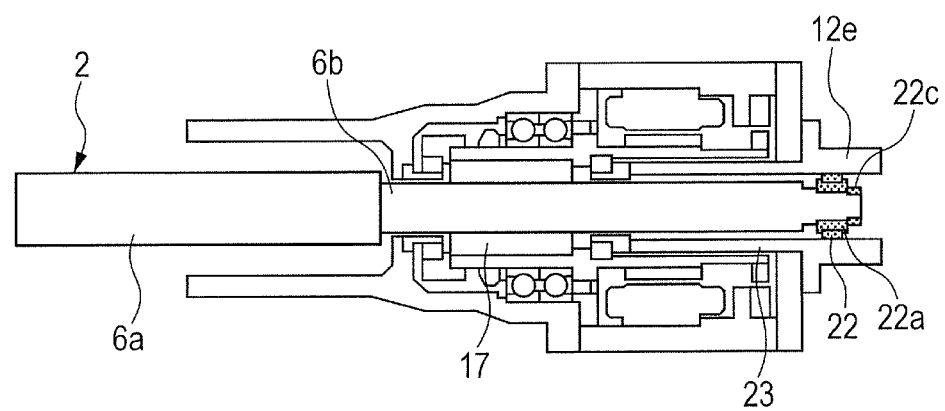
FIG. 5G is an assembly sectional view of the linear actuator according to embodiment 1 (7).

Next, the linear motion rod 2 and the screw section 6b of the planetary roller screw are moved to the end portion side of the cylindrical cylinder 23, the wear ring holder 22a in which the wear ring 22 is fitted to a recessed portion on the outer periphery is fitted to the end portion in the screw section 6b side of the planetary roller screw, of the linear motion rod 2, and is fixed to the end portion in the screw section 6b side of the planetary roller screw, of the linear motion rod 2 by the wear ring holder fixing nut 22c (FIG. 5G).

Figure 5H:
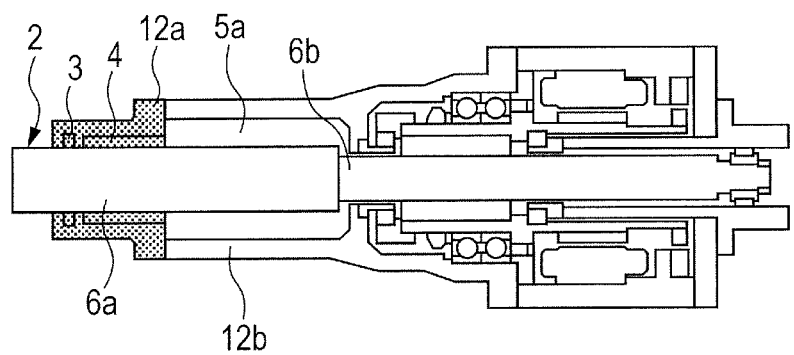
FIG. 5H is an assembly sectional view of the linear actuator according to embodiment 1 (8).

Next, while the slide section 6a of the linear motion rod 2 and the linear motion bearing section casing 12a to which the linear motion oil seal 3 and the linear motion bearing 4 are fixed are slid, the linear motion bearing section casing 12a is fitted, in such a manner that the slide section 6a of the linear motion rod 2 is inserted into the linear motion bearing section casing 12a, and the linear motion bearing section casing 12a is fixed to the rotation/linear motion converting section casing 12b (FIG. 5H).

Figure 5I:
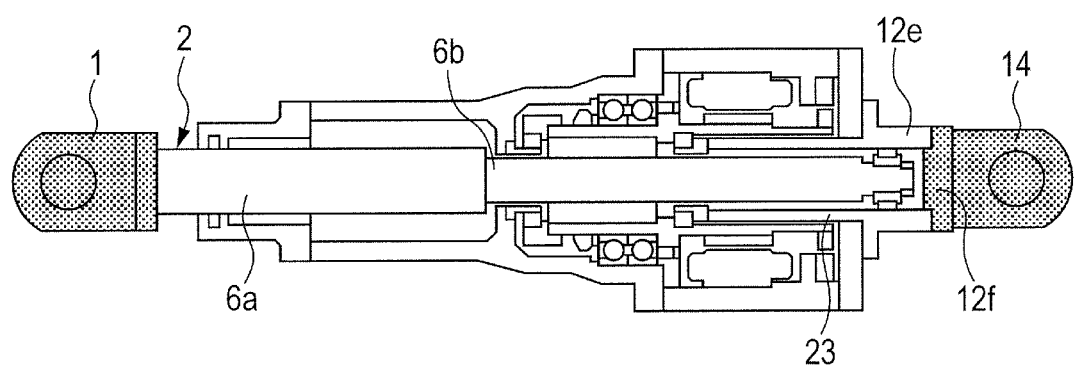
FIG. 5I is an assembly sectional view of the linear actuator according to embodiment 1 (9).

Finally, the first spherical bearing 1 is fixed to the distal end portion of the linear motion rod 2, the cylinder rear end portion casing 12f is fixed to the end portion of the cylindrical cylinder 23, and the second spherical bearing 14 is fixed to the cylinder rear end portion casing 12f (FIG. 5I).

Further, a required amount of the lubricating oil can be injected from an oil injection port not illustrated which is configured in the rotation/linear motion converting section casing 12b or the like and can be sealed and closed.

As described above, according to the configuration of the present embodiment, the external apparatus such as a pressure generating apparatus is not required besides the linear actuator main body, the piping of a pressurized fluid which is required in the case of the controller with a pressure fluid is not required, and the hollow motor is used, whereby a compact linear actuator can be realized. Further, the linear actuator provides the function as the actuator which gives a desired drive force when necessary or as the linear actuator which gives a desired damping force, and when it is not necessary to function as the linear actuator, the linear actuator can easily be driven by the external force without giving a large resistive force thereto. Further, the linear actuator which can stably keep the function irrespective of the use environment such as a temperature can be realized.

Embodiment 2

Figure 6:
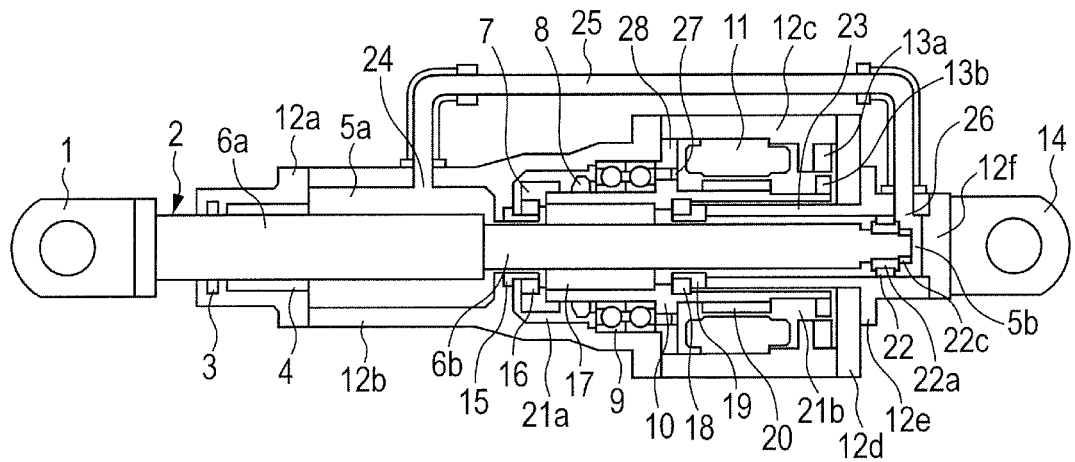
FIG. 6 is a sectional view of a linear actuator in minimum stroke according to embodiment 2.
Figure 7:
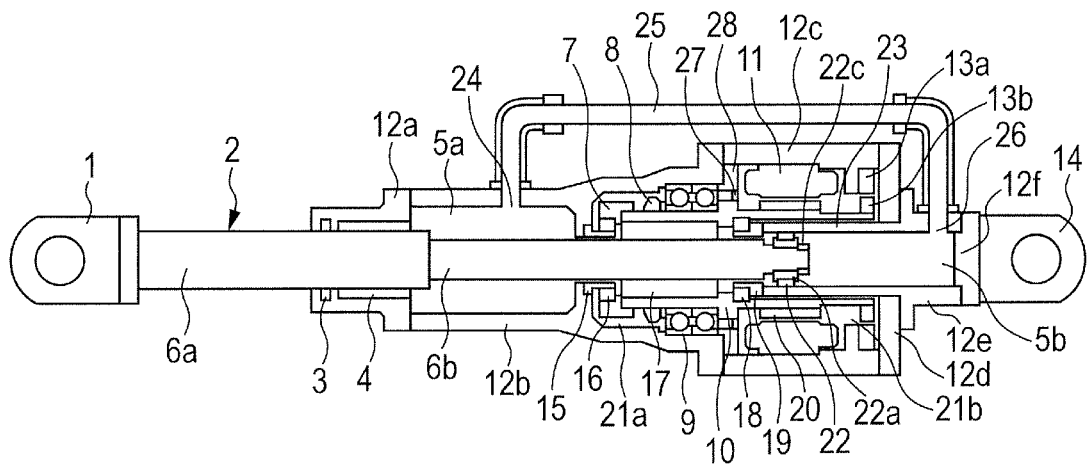
FIG. 7 is a sectional view of the linear actuator in maximum stroke according to embodiment 2.

A sectional view of a linear actuator according to embodiment 2 in the case of a minimum stroke is shown in FIG. 6, and a sectional view of the linear actuator according to embodiment 2 in the case of a maximum stroke is shown in FIG. 7.

Since a configuration of the linear actuator of the present embodiment is basically the same as the linear actuator of embodiment 1 shown in FIGS. 1 to 3, the description of the same components will be omitted, and only different components will be described.

The cylindrical cylinder 23 of the present embodiment has an opening 26 in an upper portion outside a movable range in the closed end portion side relative to the wear ring 22, of the linear motion rod 2. The rotation/linear motion converting section casing 12b which is a part of the main body has an opening 24 at an upper portion in the open end portion side relative to the nut section 17 of the planetary roller screw. The opening 26 of the cylindrical cylinder 23 and the opening 24 of the rotation/linear motion converting section casing 12b which is a part of the main body configuring the first sealed region 5 are connected by a bypass pipe 25, and flow paths which are in fluid communication with each other are formed.

As is described in embodiment 1, the linear motion rod 2 extends from the linear motion bearing section casing 12a, and changes from the state of the minimum stroke of FIG. 6 to the state of the maximum stroke of FIG. 7, whereby the volumetric capacity of the first sealed region 5 increases. Further, the first sealed region 5 is sealed by the first and the second rotary oil seal sections 15, 16, 18 and 19 and the linear motion oil seal section 3, and therefore, by the increase of the volumetric capacity thereof, the pressure in the first sealed region 5 is reduced. For lubrication between the screw section 6b and the nut section 17 of the planetary roller screw, the sliding portion of the wear ring 22 and the inner surface of the cylindrical cylinder 23, and between the linear motion bearing of the linear motion bearing section casing 12a and the slide section 6a of the linear motion rod 2, a lubricating oil is enclosed within the first sealed region 5, but in order to respond to the variation of the pressure of the first sealed region 5, a gas is also enclosed within the first sealed region 5 together with the lubricating oil. The linear actuator of the present invention is used by being installed so that the axial direction of the linear motion rod is substantially horizontal, and therefore, the lubricating oil and the gas are also present in a first-b sealed region 5b in the cylindrical cylinder 23, which is a part of the first sealed region 5. As is obvious when comparing the conditions in minimum stroke shown in FIG. 6 and in maximum stroke shown in FIG. 7, the change rate of the volumetric capacity of the first-b sealed region 5b in the cylindrical cylinder 23 is large, and therefore, the pressure change corresponding to the volumetric capacity change amount occurs, whereby movement of the lubricating oil and the gas occurs in the first sealed region 5. In particular, in the first end portion side relative to the nut section 17 of the planetary roller screw of the rotation/linear motion converting section casing 12b, a first-a sealed region 5a which functions as a storage section of the lubricating oil is formed. In other words, between the first rotary oil seal section 15 and 16, and the linear motion oil seal section 3 in the axial direction, the first sealed region 5 has the first-a sealed region 5a which functions as the storage section of the lubricating oil. It is important to reduce the force necessary to move the fluid between the first-a sealed region 5a and the first-b sealed region 5b in the second end portion side relative to the wear ring 22 in the cylindrical cylinder 23, in order to cause the linear actuator to be driven by an external force with a small load, and in realizing a quick response in the case of using the actuator as the linear actuator.

The linear actuator of the present embodiment includes the bypass pipe 25 which brings the first-a sealed region 5a and the first-b sealed region 5b into fluid communication with each other. Therefore, the lubricating oil and the gas move between the first-a sealed region 5a and the first-b sealed region 5b through the route via the bypass pipe 25, in addition to the route via the space between the wear ring 22 and the inner surface of the cylindrical cylinder 23 as in the case of embodiment 1, in accordance with the pressure difference of the first-a sealed region 5a and the first-b sealed region 5b. Therefore, movement of the lubricating oil and the gas is performed easily as compared with the case of embodiment 1. Further, the openings 24 and 26 which connect to the bypass pipe 25 from the first sealed region 5 are included in the upper side of the linear actuator which is installed horizontally, and therefore, the gas which has the role of the buffer of the pressure change preferentially moves between the first-a sealed region 5a and the first b sealed region 5b through the bypass pipe 25. Therefore, in any stroke state, the state in which the lubricating oil remains in the first-a sealed region 5a and the first-b sealed region 5b can be kept, and favorable lubricating conditions can be maintained.

The viscosity of the lubricating oil increases exponentially as temperature decreases, and therefore, at the time of a low temperature such as −20° C., the nut through-holes 17b and the wear ring holder through-holes 22b which are formed for the lubricating oil to move between the first-a sealed region 5a and the first-b sealed region 5b show large fluid resistance to the lubricating oil. Further, the flow path lengths of the first-a sealed region 5a and the first-b sealed region 5b are long, and therefore, at the time of a low temperature (around −20° C.), the influence of the fluid resistance becomes large and cannot be ignored. As a result, there is the fear of the back drive force to the stroke of the linear motion rod rising at the time of a low temperature.

Figure 8:
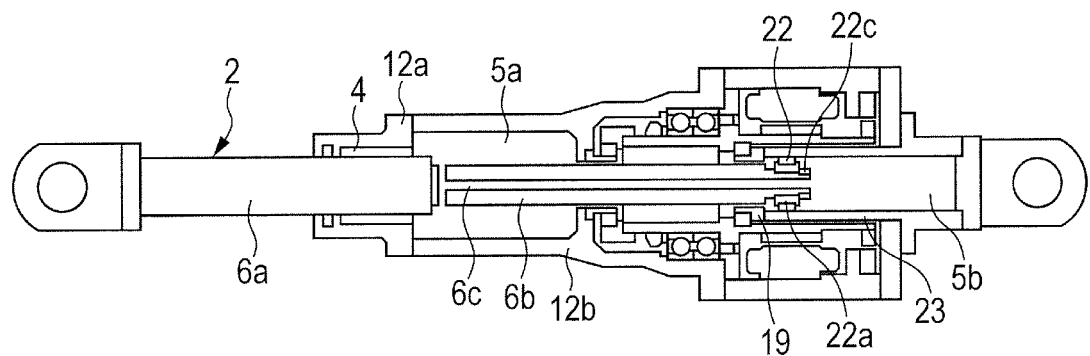
FIG. 8 is a sectional view of the linear actuator in maximum stroke according to a modified mode of embodiment 1.

As an embodiment for reducing the back drive force due to increase in the fluid resistance caused by a rise in the viscosity of the lubricating oil at the time of a low temperature, a modified embodiment of embodiment 1 is shown in FIG. 8. In the modified embodiment of the linear actuator, the linear motion rod 2 has a screw section through-hole 6c which extends in the axial direction from the end surface in the cylindrical cylinder 23 side which is the end portion of the screw section 6b of the planetary roller screw to the vicinity of the slide section 6a and brings the first-a sealed region 5a and the first-b sealed region 5b into fluid communication with each other. In other words, the screw section through-hole 6c is a through-hole which brings the end surface in the end portion side which is housed in the cylindrical cylinder 23, of the linear motion rod 2, and the outer circumferential surface in the end surface side relative to the slide section 61a, of the linear motion rod 2 into fluid communication with each other. Thereby, the lubricating oil can also move between the first-a sealed region 5a and the first-b sealed region 5b via a flow path via the screw section through-hole 6c, in addition to the flow path via the nut through-holes 17b and the wear ring holder through-holes 22b, and the flow resistance can be reduced. However, since all the flow paths are long in the axial direction, the influence of the increase of the viscosity resistance cannot be ignored in the state of a high viscosity in a low temperature such as a temperature around −20° C., and a rise in the back drive force becomes a problem.

In contrast with this, in the configuration of the present embodiment, the bypass pipe 25 having the openings 24 and 26 provided in the upper side of the first-a sealed region 5a and the first-b sealed region 5b is included, the gas flows between the first-a sealed region 5a and the first-b sealed region 5b preferentially with respect to the lubricating oil, via the bypass pipe 25. Even if the viscosity of the lubricating oil rises under the low-temperature condition, and the viscosity resistance of the lubricating oil in the flow paths of the first-a sealed region 5a and the first-b sealed region 5b rises, the rise in the slide resistance to the stroke of the linear motion rod is relieved by the presence of the bypass pipe 25. Furthermore, the volume of the air region in the first sealed region 5 becomes large correspondingly to installation of the bypass pipe 25, and therefore, the internal pressure rise by the stroke of the linear motion rod is relieved.

While in the present embodiment, the configuration which brings the first-a sealed region 5a and the first-b sealed region 5b into fluid communication with each other by the bypass pipe 25 is illustrated and described, the present invention is not limited to the configuration. The bypass flow path, which connects the opening of the first-a sealed region 5a and the opening of the first-b sealed region 5b which are located above a horizontal plane including the axis of the linear motion rod 2 when the linear actuator is placed so that the axis of the linear motion rod 2 becomes substantially horizontal, is included, whereby the similar operational effect to the bypass pipe 25 described in the present embodiment can be obtained. It should be noted that the operational effect of the present invention can be also obtained by forming, for example, a through-hole which penetrates through the rotation/linear motion converting section casing 12b, the motor section casing 12c, the motor section rear portion casing 12d and the cylindrical cylinder 12e which configure the main body 12 of the present linear actuator, and bringing the first-a sealed region 5a and the first-b sealed region 5b into fluid communication with each other.

From the above, the linear actuator which can keep a more stable function at the time of a low temperature (around −20° C.) can be realized, with respect to the first embodiment.

Embodiment 3

Figure 9:
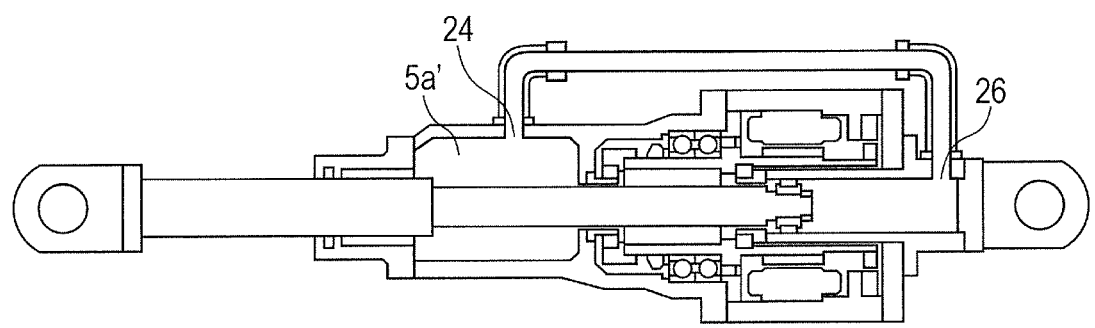
FIG. 9 is a sectional view of the linear actuator in maximum stroke according to embodiment 3.

FIG. 9 shows a sectional view of a linear actuator according to embodiment 3 at a time of a maximum stroke.

Since a configuration of the linear actuator of the present embodiment is the same as the linear actuator of embodiment 2 shown in FIG. 6 and FIG. 7 in the basic configuration, the description of the same components will be omitted, and different components will be described.

The linear actuator of the present embodiment differs from the case of embodiment 2 in the shape of the rotation/linear motion converting section casing 12b which configures the first-a sealed region 5a. The other components are similar to those of embodiment 2.

The shape of the rotation/linear motion converting section casing 12b which configures an expansion first-a sealed region 5a' in the present embodiment is vertically asymmetrical with respect to the horizontal plane including the axis of the linear motion rod 2, and the rotation/linear motion converting section casing 12b is configured so that a volumetric capacity in the upper side relative to the substantially horizontal plane including the axis of the linear motion rod 2 of the expansion first-a sealed region 5a' becomes larger than the volumetric capacity in the lower side, in the linear actuator which is installed so that the axis of the linear motion rod 2 becomes substantially horizontal.

By including the above configuration, the gas of a volumetric capacity relatively large with respect to a predetermined amount of lubricating oil can be enclosed. Thereby, V in expression (2) becomes large. Therefore, when A×L that is the change amount of the volumetric capacity of the gas is constant, V/(V−A×L) becomes small and the pressure change amount in the first sealed region 5 can be made small. The amount of the fluid that flows in response to the pressure change decreases since the pressure change amount decreases, and therefore, the back drive force can be made small. Thereby, the force which is required to drive the linear motion rod 2 against the pressure in the first sealed region 5 which changes in accordance with the stroke length becomes small, and smoother drive of the linear actuator is enabled. Furthermore, the degree of freedom of the design of the apparatus which satisfies expression (2) is improved.

Further, the expansion first-a sealed region 5a' is configured to have a shape such that the volumetric capacity in the upper side relative to the axis of the linear motion rod 2 is larger than the volumetric capacity in the lower side. In the mode like this, the volumetric capacity inside the expansion first-a sealed region 5a' is made large, whereby the lubricating oil which accumulates in the part in the lower side from the axis of the linear motion rod 2 in the expansion first-a sealed region 5a' having the function as the lubricating oil reservoir can be stably supplied to the planetary roller screws (6, 17) which requires lubrication and the wear ring 22 similarly to embodiment 1 and embodiment 2 in which the volumetric capacities of the first-a sealed regions 5a are not increased. Further, the opening 24 provided at the upper portion of t-e expansion first a sealed region 5a' and the first-b sealed region 5b are in fluid communication with each other, and therefore, the gas as a pressure buffer can favorably flow between the expansion first-a sealed region 5a' and the first-b sealed region 5b via the bypass pipe 25.

By having the configuration of the present embodiment, the linear actuator which keeps sealability in the first sealed region 5 more reliably and realizes the stable function can be provided.

Embodiment 4

Figure 10:
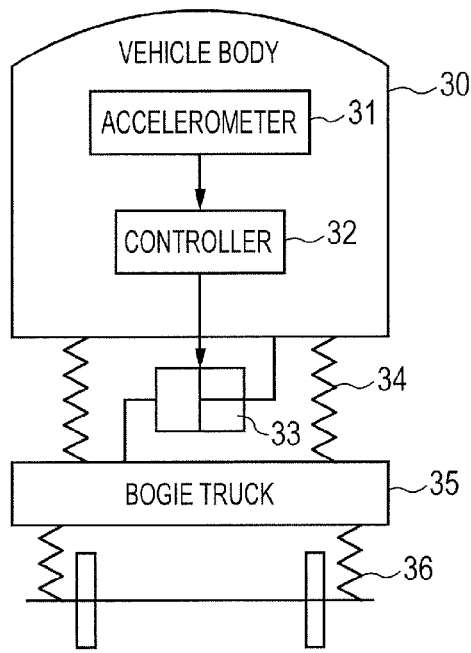
FIG. 10 is a schematic configuration diagram of a rocking controller for a railway vehicle to which the linear actuators of embodiments 1 to 3 are applied.
Figure 11A:
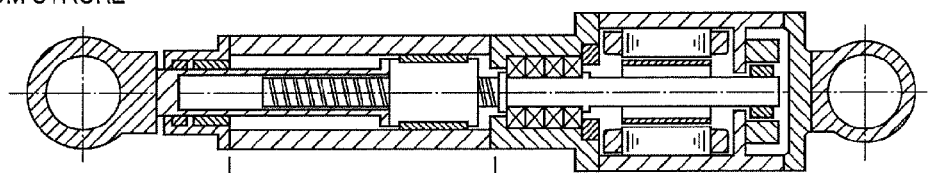
FIG. 11 is a sectional view of a conventional linear actuator (a) in minimum stroke and (b) in maximum stroke.
Figure 11B:
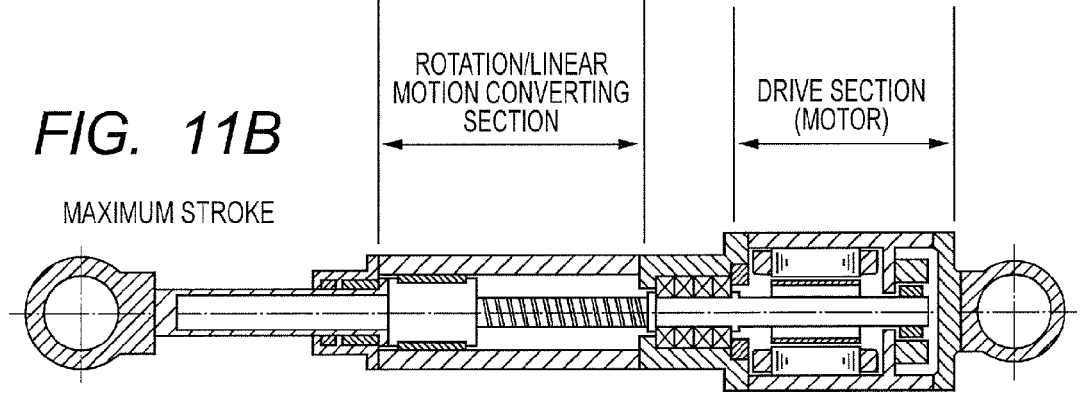

FIG. 10 shows a schematic configuration diagram of a rocking controller for a railway vehicle to which the linear actuators according to embodiments 1 to 3 of the present invention are applied. The rocking controller for a railway vehicle of the present embodiment has the actuators of the present invention of embodiments 1 to 3 installed between a bogie truck 35 and a vehicle body 30, and includes a controller 32 which performs active control of the drive of a linear actuator 33 so as to suppress rocking of the vehicle body 30.

Vibration is transmitted to the bogie truck 35 from wheels via a primary spring 36, and the vibration of the bogie truck 35 is transmitted to the vehicle body 30 via a secondary spring 34. An accelerometer 31 measures an acceleration of the vehicle body 30, and actively controls the linear actuator 33 to suppress rocking (vibration) of the vehicle body 30 in accordance with the acceleration which is measured. To active control by the controller, various known control methods can be applied.

In a railway vehicle, suppressing the vibration (rocking) to the direction perpendicular to the traveling direction of the vehicle which is a horizontal direction is important in making the ride of a railway vehicle excellent and stabilizing the traveling attitude of the vehicle at the time of traveling. In the case of using the linear actuator to suppress rocking of a railway vehicle, it is the most efficient disposition method to install the linear actuator in the direction perpendicular to the traveling direction of the vehicle and in the horizontal direction. In the point of housing the linear actuator within the restricted width of the railway vehicle, the compact linear actuator of the present invention has a large merit. Especially under the conditions to which the narrow-gauge standards are widely applied, it is especially advantageous to apply the compact linear actuator of the present invention to the rocking controller of the vehicle body in a railway vehicle.

The rocking controller for a railway vehicle can be realized, which uses the actuator that excludes the influence of increase of the back drive force due to viscosity increase of the lubricating oil at a low temperature, and stably functions in the state in which the back drive force is low, even under the severe use conditions that maintenance such as frequent replacement is difficult to carry out, and the temperature change in the use environment where the controller is installed is large, like the rocking controller for the vehicle body in a railway vehicle.

This application claims the benefit of Japanese Patent Application No. 2010-157015, filed Jul. 9, 2010, which is hereby incorporated by reference herein in its entirety.

REFERENCE SIGNS LIST

1: first spherical bearing
2: linear motion rod
3: linear motion oil seal
4: linear motion bearing
5: first sealed region
5$a$: first-a sealed region
5$a'$: expansion first-a sealed region
5$b$: first-b sealed region
6$a$: slide section
6$b$: planetary roller screw (screw section)
6$c$: screw section through-hole
7: nut fixing ring
8: bearing fixing nut
9: angular bearing
10: rotary hollow shaft
11: hollow motor (stator winding)
12$a$: linear motion bearing section casing
12$b$: rotation/linear motion converting section casing
12$c$: motor section casing
12$d$: motor section rear portion casing
12$e$ (23): cylindrical cylinder
12$f$ (14): cylinder rear end portion casing
13$a$: VR resolver (stator side)
13$b$: VR resolver (rotor side)
14: second spherical bearing
15: first cylindrical shaft (first rotary oil seal section)
16: first oil seal (first rotary oil seal section)
17: planetary roller screw (nut section)
17$a$: roller
17$b$: nut through-holes
18: second oil seal (second rotary oil seal section)
19: second cylindrical shaft (second rotary oil seal section)
20: hollow motor (rotor permanent magnet)
21: second sealed region
21$a$: bearing region
21$b$: motor region
22: wear ring
22$a$: wear ring holder
22$b$: wear ring holder through-holes
22$c$: wear ring holder fixing nut
23: cylindrical cylinder
24: opening
25: bypass pipe
26: opening
27: noncontact labyrinth seal
28: angular bearing pressing plate
30: vehicle body
31: accelerometer
32: controller
33: linear actuator
34: secondary spring
35: bogie truck
36: primary spring

The invention claimed is:

1. A linear actuator, comprising:
a main body of a hollow structure having an open end portion and a closed end portion;
a cylindrical cylinder that is fixed to a closed end portion side in the main body, and has an open end at an open end portion side;
a linear motion rod having one end portion extending from the open end portion of the main body, and the other end portion having a wear ring on an outer circumferential portion, the wear ring being housed in the cylindrical cylinder slidably in an axial direction and having a slide section that is slidable in the axial direction via a linear motion oil seal of the open end portion on an outer periphery of the open end portion side, the linear motion oil seal and the sliding section sealing an interior of the main body; and
a rotary hollow shaft supported in the main body rotatably about an axis of the linear motion rod,
wherein the rotary hollow shaft has a permanent magnet on a part of an outer circumferential surface, the main body has a stator winding section at a position which faces the permanent magnet, of an inner surface thereof, and the permanent magnet and the stator winding section configure a hollow motor,
the rotary hollow shaft has a nut section that is fixed coaxially, the linear motion rod has a screw section which engages with the nut section, on an outer circumferential surface between the slide section and the wear ring, and the nut section and the screw section are engaged with each other to configure a rotation/linear motion converting mechanism in which by the rotary hollow shaft being rotated, the linear motion rod linearly moves in the axial direction,
in both sides in the axial direction of the linear motion rod, of the nut section, two rotary oil seal sections which seal gaps between the rotary hollow shaft and members fixed to the main body are included, and
the rotary oil seal sections define a first sealed region which is a region in the main body in which the linear motion rod linearly moves and in which a lubricating oil and a gas coexist by separating the first sealed region from a second sealed region in which the hollow motor is disposed, and seal the first sealed region in cooperation with the linear motion oil seal section.

2. The linear actuator according to claim 1,
wherein the two rotary oil seal sections are configured by a first rotary oil seal section formed by an outer periphery of a first cylindrical shaft fixed to the main body in the open end portion side relative to the nut section and a first oil seal fixed to the rotary hollow shaft, and a second rotary oil seal section formed by an outer periphery of a second cylindrical shaft fixed to the open end of the cylindrical cylinder and a second oil seal fixed to the rotary hollow shaft.

3. The linear actuator according to claim 1,
wherein the linear actuator is used by being installed so that the axial direction of the linear motion rod becomes substantially horizontal,
the cylindrical cylinder has an opening in an upper portion in the closed end portion side relative to a movable range of the wear ring of the linear motion rod,
the main body has an opening in an upper portion of the main body configuring the first sealed region, in the open end portion side relative to the nut section, and
a flow path that brings the opening of the cylindrical cylinder and the opening of the main body into fluid communication with each other is included.

4. The linear actuator according to claim 3,
wherein in the first sealed region in the open end portion side relative to the nut section, a volumetric capacity in an upper side relative to a horizontal plane including the axis of the linear motion rod is larger than a volumetric capacity in a lower side relative to the horizontal plane.

5. The linear actuator according to claim 1,
wherein a diameter of the slide section of the rotary oil seal section is not larger than 1.5 times as large as a diameter of the screw section of the linear motion rod.

6. The linear actuator according to claim 5,
wherein the diameter of the slide section of the rotary oil seal section is not larger than 1.3 times as large as a diameter of the screw section of the linear motion rod.

7. The linear actuator according to claim 2,
wherein the first sealed region has a storage section of a lubricating oil, between the first rotary oil seal section and the linear motion oil seal in the axial direction.

8. The linear actuator according to claim 1,
wherein the following condition is satisfied, $$V/(V-AL)<1.3$$

where A represents a sectional area perpendicular to the axial direction of the slide section of the linear motion rod, L represents a maximum stroke length of the linear motion rod, and V represents a volumetric capacity of a gas in the first sealed region at a time of a maximum stroke.

9. The linear actuator according to claim 1,
wherein the rotation/linear motion converting mechanism configured by the nut section and the screw section is configured by a planetary roller screw.

10. The linear actuator according to claim 1,
wherein the nut section has through-holes penetrating in the axial direction.

11. The linear actuator according to claim 1,
wherein the wear ring of the linear motion rod is fixed to the linear motion rod via a wear ring holder fixed to the linear motion rod, and
the wear ring holder has through-holes penetrating in the axial direction.

12. The linear actuator according to claim 1,
wherein the linear motion rod has a through hole which provides fluid communication between an end surface in the other end portion side and an outer circumferential surface in the end surface side relative to the sliding section.

13. A rocking controller for a railway vehicle, having:
the linear actuator according to claim 1 that is installed between a bogie truck and a vehicle body of a railway vehicle, and a controller that actively controls drive of the linear actuator to suppress rocking of the vehicle body.

* * * * *